United States Patent [19]

Bumgardner

[11] 4,156,106
[45] May 22, 1979

[54] MULTIPLEX-DATA BUS MODULATOR/DEMODULATOR

[75] Inventor: Jon H. Bumgardner, Ridgecrest, Calif.

[73] Assignee: The United States of America as represented by the Secretary of the Navy, Washington, D.C.

[21] Appl. No.: 863,638

[22] Filed: Dec. 22, 1977

[51] Int. Cl.² .................... H04J 3/08; H04L 15/00
[52] U.S. Cl. ............................ 178/68; 179/15 AL
[58] Field of Search ........... 178/2 C, 2 D, 2 E, 58 R, 178/59, 68; 179/15 AL; 340/15.5 TS

[56] References Cited

U.S. PATENT DOCUMENTS

| | | | |
|---|---|---|---|
| 3,646,274 | 2/1972 | Nadir et al. | 179/15 AL |
| 3,803,405 | 4/1974 | Ohnsorge et al. | 179/15 AL |
| 3,890,471 | 6/1975 | Hachenburg | 179/15 AL |
| 3,990,036 | 11/1976 | Savit | 179/15 AL |
| 3,996,553 | 12/1976 | Siems et al. | 179/15 AL |
| 4,010,326 | 3/1977 | Schwartz | 179/15 AL |
| 4,047,246 | 9/1977 | Kerllenevich et al. | 178/59 |

Primary Examiner—Thomas A. Robinson

[57] ABSTRACT

Improved modem terminals spaced along a high-frequency triaxial data line of a long length. Each modem employs signal delay and differential detection circuitry to detect signals on the line which may have been degraded in transmission. Conversion circuitry and input-output circuitry interface the data line with terminal devices and other data transmission lines.

12 Claims, 9 Drawing Figures

MULTIPLEX-DATA BUS MODULATOR/DEMODULATOR

BACKGROUND OF THE INVENTION

1. Field of the Invention

This invention pertains to the field of electronic communication. More particularly, the invention pertains to fixed line electrical communication systems. In greater particularity, the invention relates to pulse data transmission over long line lengths. By way of further characterization, but without limitation thereto, the invention will be described as it pertains to a two-line, pulse-data transfer system between a plurality of spaced terminals.

2. Description of Prior Art

Prior art fixed line systems suffer from engineering trade-offs to establish a threshold sensitive enough to enable reception from distant transmission terminals but capable of excluding noise in the presence of strong signals. That is, if the thresholding circuitry will permit detection of weak signals originating at remote terminals, it will be ineffective to reduce noise in the presence of strong signals. Such trade-offs have limited the maximum length of data transfer lines.

Prior art systems now in use also suffer from interruption of communication ability when a catastrophic failure of the transmission line occurs. That is, signal reflections from shorted or open lines produce spurious signals. This limitation has limited installation in large naval vessels where combat conditions increase the likelihood of this type of failure.

Other shortcomings in the prior art are, of course, known and each problem has a known method of reducing the effect of the particular shortcoming. Although many of these prior art systems are satisfactory for their intended purposes, they have been unable to provide a reliable, high-speed digital communication system suitable for use in hazardous naval environments.

SUMMARY OF THE INVENTION

The invention employs a plurality of two-port and four-port modems which are interconnected by a system of transmission lines terminated in their characteristic impedances which permit digital communications between widely spaced points. The system employs a variable rate threshold rather than a level threshold. This permits transmission paths of several kilometers with high signal rates. The system also features a temperature-compensated time delay, which may be retriggered immediately, permitting a second pulse to be processed prior to the completion of the first pulse to result in a negative time of recovery.

The four-port units couple two lines and permit fault isolation with minimum interruption of communication. A non-return-to-zero to bi-phase data conversion circuit is employed to facilitate the system operation. These circuit features and others to be described herein cooperate to provide an improved data transmission system, which is an object of the invention.

BRIEF DESCRIPTION OF THE DRAWINGS

FIG. 1 is a diagrammatic view of the system of the invention;

DESCRIPTION OF THE PREFERRED EMBODIMENT

Referring to FIG. 1, a block diagram shows the system of the invention incorporating a triaxial data line 11. A plurality of modulator-demodulator, modem, units 12, are series connected into data line 11 at utilization terminals where the data originates or is utilized. Although three modem units 12 per line 11 are shown for purposes of illustration, a greater or lesser number may be used as determined by the needs of the system.

Each end of transmission line 11 is terminated in its characteristic impedance. This termination is illustrated schematically by resistance 13. The use of terminating resistances in this application is well understood in the art and serves to prevent reflected waves from traveling along line 11 and being processed as signals by the individual modem units 12. In the triaxial line 11 used in developmental models, resistance 13 is a seventy-five ohm unit connected across the concentric inner conductors. The outer conductor-to-shield termination may also be terminated in its characteristic impedance, ten ohms, if desired.

Transmission line 11 passes through each modem 12 by means of input and output connectors 15 of conventional low-loss construction. The input and output terminals are internally connected by a delay line 16. Delay line 16 serves to place a small time delay in signal passage through each modem 12. This time delay functions in the detector circuit in a manner to be more completely explained herein.

In order to add more stations, line 11 need only be broken and another modem 12 inserted. Additionally, the data transmission line 11 may be duplexed with a similar line 11' by means of a four-port network 14. Also, if desired, the input-output connections of the individual modems 12 may be broken and additional modem circuitry may be added to permit back-to-back operation. As will be more completely explained, four-port network 14 transfers the data on line 11 to line 11' and vice versa. In the event of catastrophic failure of either line, network 14 serves to isolate the two transmission lines 11 and 11' to prevent bad data from being placed on the functioning line. The location of such failures may also be facilitated by the selective insertion and removal of network 14 in a manner to be more completely described herein.

In the illustrated embodiments, primed numbers indicate the use of similar components as their unprimed counterparts and will not be explained in detail, preventing redundancy. Similarly, the same components bear the same numbers in the several views. In component designation, characters after the hyphen indicate connection points.

Figure 2:
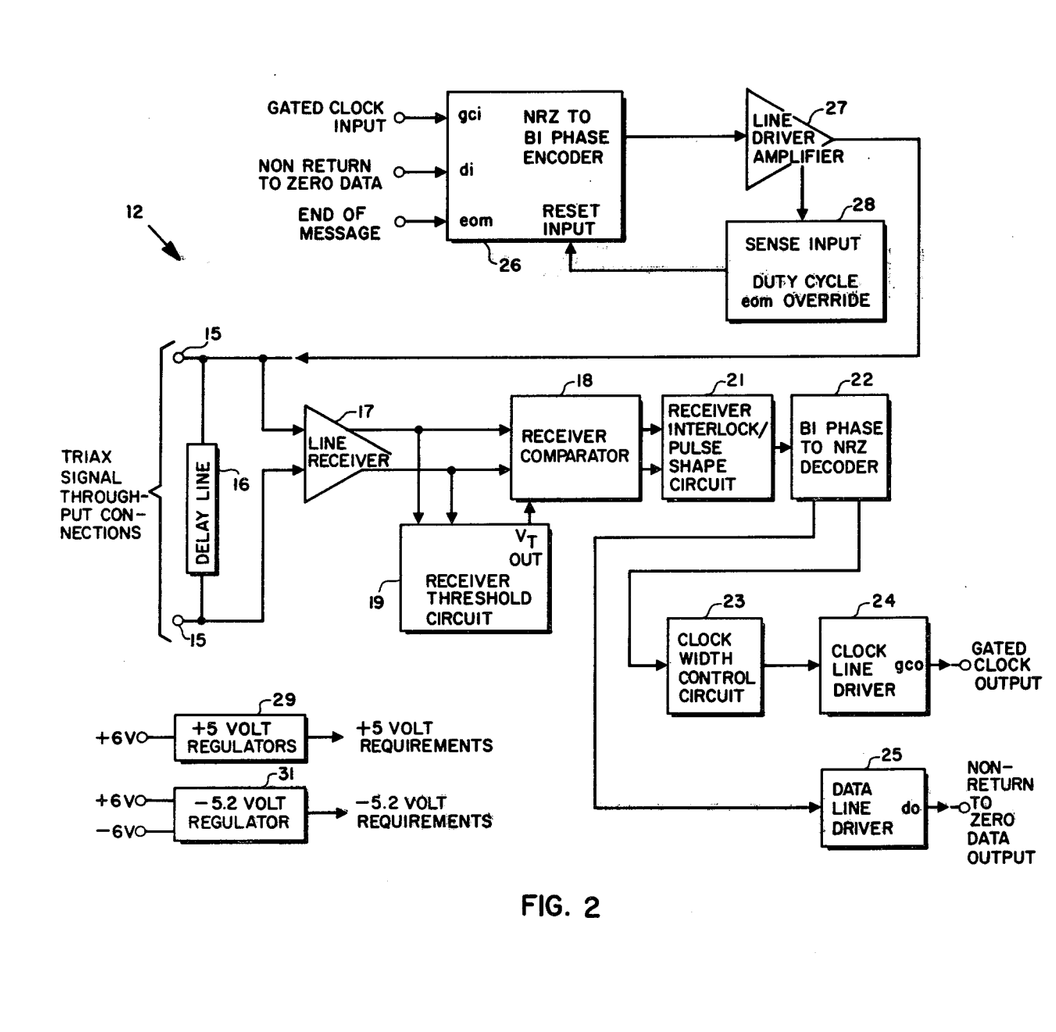
FIG. 2 is a diagrammatic view of a two-port modem shown in FIG. 1.

Referring to FIG. 2, the major component circuits used in the two-port modem units 12 are illustrated and the mode of operation of the unit may be more readily explained in connection therewith. As shown, the throughput signal on transmission line connectors 15 traverses delay line 16, which may be a length of transmission line. In developmental models, a length of RG 59 coaxial cable was connected between the inner two contacts of BJ 80 connectors used for input and output connectors 15.

Because of the delay line, the modem 12 appears electrically to be a length of transmission line. This is true whether or not modem 12 is electrically powered. This is an important advantage where data transmission systems may be exposed to high risk environments such as when installed in combat aircraft or ships of the line.

A line receiver amplifier 17 is connected to delay line 16 and differentially amplifies the signals at each end thereof. Amplifier 17 has its output connected to a receiver-comparator 18 and a receiver threshold circuit 19. Receiver-comparator 18 has its output electrically connected to a receiver interlock and pulse shape circuit 21 which guarantees that only alternating sign dv/dt threshold crossings will be further processed. The interlock portion of the circuit permits the passage of signals of the same sign when the signals are traveling in opposite directions as would be the case for signals alternately originating in modems on opposite sides from the receiving modem. The output of the receiver interlock and pulse shape circuit 21 is electrically connected to a bi-phase to NRZ decoder circuit 22.

The bi-phase to NRZ decoder circuit 22 utilizes a timing circuit which is activated by an initial pulse which indicates the start of each message bit. Timed outputs create the non-return-to-zero signal, termed NRZ signal, in response to the presence or absence of received signals stored during the time intervals. The output of the bi-phase to NRZ decoder circuit 22 is electrically connected to a clock width control circuit 23 and to a data line driver circuit 25.

Clock width control circuit 23 changes the time marker pulses to a controlled width clock pulse. This output is connected to a clock line driver circuit 24. Line driver circuits 24 and 25 convert the ECL logic signals to zero-to-three volt drive signals having a desired impedance to be compatible with the load driver thereby.

The transmitter portion of modem 12 is somewhat more simple in construction, including only an encoder circuit 26, a line driver circuit 27, and an override circuit 28.

The NRZ-to-bi-phase encoder 26 receives a gated clock input signal, and the NRZ data signals from the utilization device and an end-of-message, eom, signal upon completion of the message. The output is amplified by line driver amplifier 27 and applied to the triaxial line via one connector 15 and delay line 16 to establish a gated, free-floating pulse data.

The duty cycle-eom override circuit senses any long term steady command and resets the encoder to produce a data low to clear a busy line and permit data to flow on the line in a normal manner.

Each modem unit 12 and four port network 14 also includes voltage supplies for the operation of the active circuitry contained therein. Included in this conventional circuitry are a plurality of +5 volt regulators 29 and −5.2 volt regulators 31. The operation of these circuits will be more completely explained in connection with FIGS. 6 and 7.

Figure 3:
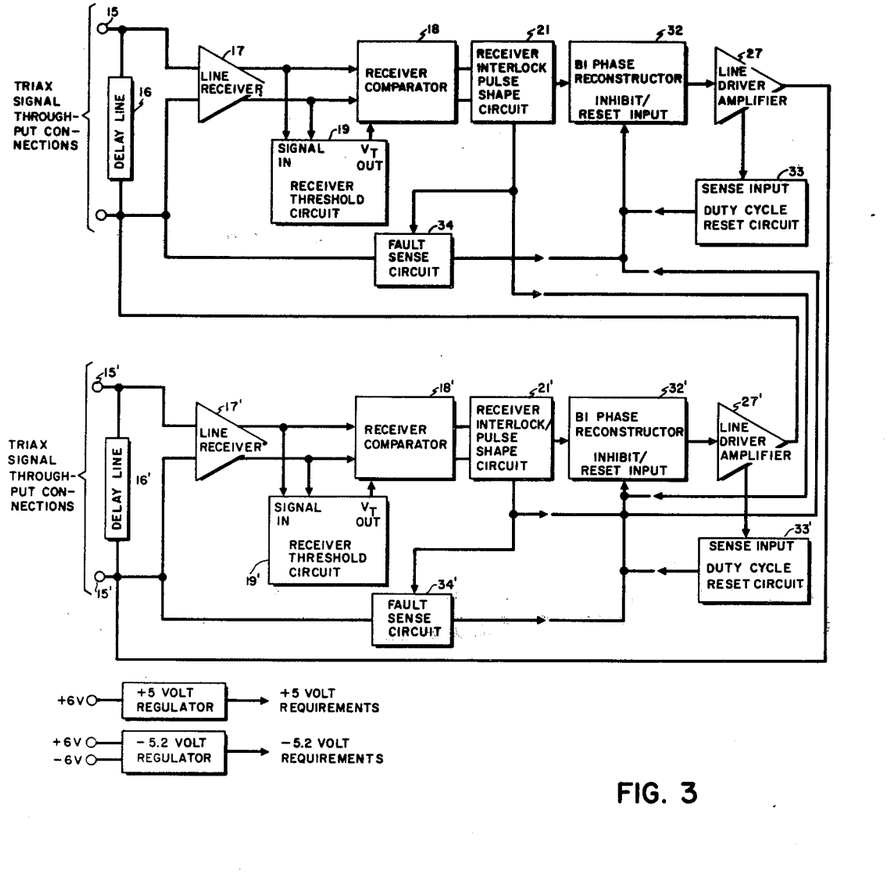
FIG. 3 is a diagrammatic showing of a four-port modem shown in FIG. 1.

Referring to FIG. 3, it will be clear that the four-port network 14 uses many of the same circuits used in the two-port modem units 12. Since these similar circuits serve the same purpose as their modem counterparts, they will not be further described in connection with this figure.

A major difference in the operation is that the source of driving signals is from a different transmission line rather than an external utilization device. In the illustration, these lines are illustrated as lines 15 and 15' and correspond to the arrangement shown in FIG. 1. As a consequence of this fundamental difference, rather than converting the bi-phase signals to NRZ signals, the signals are reconstructed into bi-phase signals having the desired signal parameters and format for transmission on the other line. This reconstruction is performed by bi-phase reconstructor circuit 32.

The four port network 14 reconstructs the amplitude of the pulses but permits some residual variations in timing or synchronization and pulse width. The two port modems 12 will reconstruct the pulse width in the clock width control circuit 23; and when modems 12 are connected back-to-back, as previously described, a greater fidelity may be obtained. Similarly, synchronization may be restored by conventional techniques. However, in keeping with good design practice and recognized engineering tradeoffs, such circuitry is not required in the present system and is not provided.

A sense input duty cycle unit circuit 33 functions in the same manner and for the same purpose as the eom override circuit 28, previously discussed. A fault sense circuit 34 impresses a constant current source across the triaxial transmission line 11; and voltages outside the expected range, caused by open or short circuit conditions on the line, operate a latch to inhibit further data transfer. This permits the other line to function in a normal fashion until the fault can be corrected. As will also be obvious to those familiar with electronic systems used in this type of operation, the four-port network 14 may be moved along line 11 or line 11' to isolate or locate the failure in transmission lines.

Figure 4:
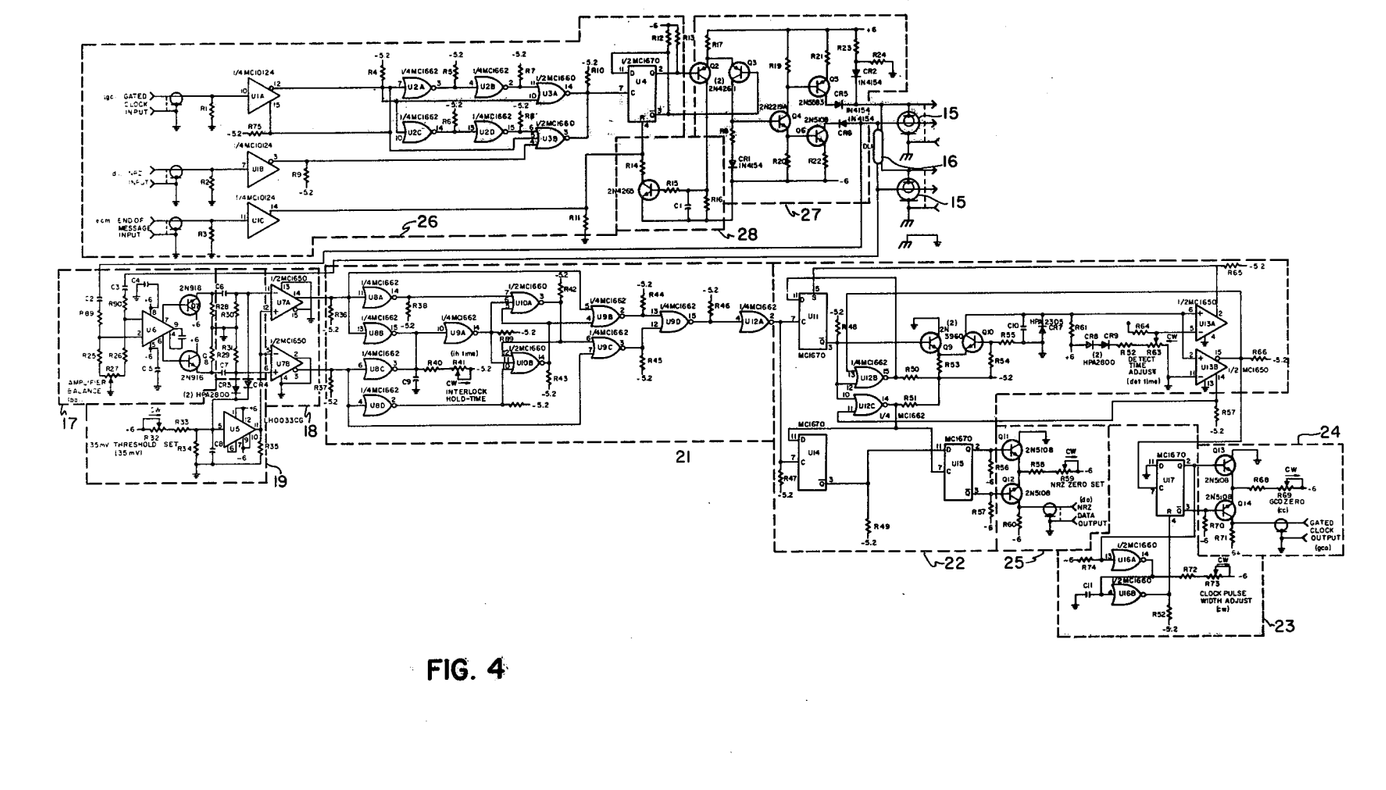
FIG. 4 is a schematic representation of the two-port modem shown in FIG. 2.

Referring to FIG. 4, a more detailed description of the implementation of the two port modem shown in FIG. 2 will be described together with the essential features of the circuit operation. Considering first the non-return-to-zero to bi-phase encoder circuit 26, the inputs of a gated clock signal and a NRZ signal together with the end-of-message, eom, inputs are received on conventional fixed wire cabling as indicated by the socket connections. A suitable terminating resistor terminates these lines in a characteristic impedance of the line, for example, 50 ohms. These signals are fed to portions of a conventional multifunction integrated circuit which are configured to be TTL to ECL translators. The output of the gated clock signal amplifier, U1A is fed to a plurality of signal processing ECL devices having 0.9 nano-second processing delays to delay the clock functions in order to allow digital differentiations of the rising and falling of clock edges. The NRZ input is similarly amplified and fed to U3B such that the falling edge of the clock signal is not gated to the U4 processor when the NRZ input is a low for the two nano-second period and immediately following a gated clock input falling edge. Thus, the input to DI, the NRZ input, may assume any value during any portion of the bit period, except that a proper predetermined level must be maintained for a two nano-second period beginning at the gated clock input falling edge. It should be noted that a theoretical operation of the modem is possible with a 50% duty cycle, however, in actual practice, the clock is high only about 40% of the cycle. The rest is an advantageous arrangement permitting a larger tolerance margin in decoding.

As illustrated, U4 is a conventional digital processor flip-flop and has outputs at U4-2 and U4-3 which are the complementary bi-phase output of the NRZ input signal as determined by the gated clock input signal. These complementary signals are connected from U4-2 and U4-3 to the line driver circuit 27. Line driver 27 is shown to include solid state devices Q2, Q3, Q4, Q5, Q6, and diodes CR1, CR2, CR5, and CR6, plus the associated passive components illustrated. R17 provides a voltage feed for Q2 and Q3 and serves as a 23 milliamp current source therefor. Q2 and Q3 are wired as a differential pair.

As will be appreciated, U4-2 is at a logic low except during message transmission; and correspondingly Q2 is normally turned on, causing R16 to have a quiescent voltage of approximately 2 volts across it. Further, since R18 and CR1 have quiescent drops of zero volts, Q4 is not conducting during non-message time.

With Q4 off, R19 and R20 have no current flowing therethrough and, consequently, no voltage drops, so that Q5 and Q6 are also turned off during quiescent periods thereby placing essentially open collectors across the triaxial line. R23 and R24, together with a diode CR2, keep the triaxial inner shield from going below approximately 1.8 volts with inputs having about 150 ohms source impedance. This circuit configuration provides a safety operational feature for other modems on the line when a power failure of an individual modem unit 12 occurs. Under such circumstances, the CR2 anode voltage goes to zero and a high impedance back biased diode results. This diode is placed as a load to the triaxial inner shield. Also, the Q5 and Q6 bases go to zero volts through the two 100 ohm resistors R19 and R20. However, the internal PN diode, Q5, between the collector and base is anode-to-anode with the diode CR5. This effectively opens the triaxial inner shield-to-Q5 base ground potential path since the conduction is blocked by either the Q5 internal diode structure or by CR5.

Similarly, the internal Q6 diode and the CR6 diode provide essentially an open circuit. Thus, no loading of the triaxial line is possible since no semi-conductor paths are available. Therefore, in the event of a modem power failure, other modems in the line remain unaffected. Other loadings as might be presented by C2, C3, R25, R26, R89, R90, and U6 may be shown to have essentially infinite DC resistance and approximately 2.4 k ohm AC impedance, which is extremely high in comparison to the normal 37 ohm parallel line signal impedance. This circuit configuration, permitting power failure of an individual modem from affecting others in the circuit, has important consequences in modern naval applications.

Further, considering the operation of line driver amplifier 27, it may be seen that as U4-2 and U4-3 logic values begin to alternate back and forth with the bi-phase command signal, the Q2–Q3 differential pair alternately dumps the 23 milliampere current source into R18, CR1 and R16. With Q3 conducting, about 3.6 volts are developed across R18 and CR1 which results in Q4 turning on with about 3 volts appearing across R20 and 3 volts across R19. As will be appreciated, these voltages turn on Q5 and Q6 resulting in the application of about 2.4 volts across R21 appearing at the Q5 collector. These conduction currents flowing in the collectors of Q5 and Q6 are essentially equal and flow through CR-5 and the two triaxial cables in parallel and CR6. As may be readily calculated, the result of the above is that a nominal 4 volts appears across the triaxial center conductor to inner shield and serves as a driving signal whenever U4-2 is high and drops to a nominal zero volts during U4-2 low periods. Actual propagation time through the amplifier is approximately 4.5 nanoseconds. The balanced current sources from the high impedance floating line driving current source result in a floating 4 volt voltage source having a 37.5 ohm impedance.

The operation of the duty cycle eom override circuit 28 which includes resistors R14, R15, R16, a capacitor indicated at C1 and a solid state transistor Q1 will now be described in greater detail. During normal quiescent situations, Q1 is turned on meaning that an emitter follower output of U1C-14 is loaded with a 560 ohm resistor connected to the −6 volt supply. In this situation, the R11 current is negligible because the U4-4 reset input is controlled by the clamping action of the U1C-14 voltage. Thus, the eom level is the controlling factor determining whether the NRZ to bi-phase circuit output is held in a reset condition or is allowed to toggle out the bi-phase coding. Thus, whenever the eom input is high, the modem transmitter portion is inoperative.

When eom goes low, and a bi-phase signal is being transmitted, the mean value of the Q2 current is stabilized at about 12 milliamperes; and the voltage across R16 is approximately 1.2 volts. This condition causes a small amount, approximately 5 milliamps, of Q1 base current to flow and maintains Q1 in a saturated state allowing, R14 to fully load R11 and U1C-14. If the bi-phase toggling stops, and U4-2 is left in the high state, R16 current goes to zero as C1 discharges; and after about a 200 nano-second time constant, Q1 ceases to conduct. R11 then pulls U4-4, in the emitter output of U1C-14, to an ECL logic high. This resets U4-2 to the desired logic load quiescent value and proper modem operational levels are restored. Note that this circuit is operational if the eom is low and the gated clock input fails to continue generating the bi-phase signals. With the eom high, the correct quiescent non-transmitting conditions automatically exist and normal operation is assured.

Considering now the operation of the receiving portion of the modem, it will be remembered that the delay line 16 serves to delay throughput signals as previously discussed. The signals from either end of delay line 16 are coupled to U6. U6 is a conventional state-of-the-art video amplifier having differential inputs indicated at 1 and 2 and outputs which are connected to separate amplifiers Q7 and Q8. The stray capacitance of the video amplifier U6 together with resistors R89 and R90 provides a time constant which is sufficient to keep the U6 inputs within a plus or minus one volt range. Although a variety of video amplifiers may be used in this application, that manufactured by Fairchild and sold under the designation μA733 has proven satisfactory in developmental models and provides a 14 decibel gain from DC to 15 MHz and, together with the indicated resistive and capacitive network, extends useful gain to the 150 MHz region. Q7 and Q8 serve to lower the output impedance of U6 and provide a low frequency cutoff for the U7 comparator and U5 threshold circuits, which are to be described later. Thus, by this circuitry, all difference signals developed from one end of the delay line to the other are effectively amplified by a high pass filter having a 1 MHz low frequency point as determined by the RC time constant discussed and presented at U7A-11 and U7B-6 as oppositely phased signals. For successive bi-phase transitions, the positive U7 terminal will alternate back and forth causing U7A and U7B outputs to alternately go negative as the U7 inputs exceeds the threshold voltage determined by U5 and output at U5-11.

Because of the wide range of voltages due to differences of length of transmission line 11, signals on this line made of a plurality of modem units 12 will range from 4 volts maximum peak, for very close modems having no or little attenuation, to only 50 millivolts peak, corresponding to a modem separated by a 3,000 foot cable. Because of these variations, a threshold circuit is required to provide uniform response independent of transmission cable length. This function is performed by a threshold circuit 19 which includes diodes CR3 and CR4 and four resistors, R32 through R35, a capacitor, C8 and an operational amplifier, U5.

As illustrated, this threshold circuit is essentially a full wave recifier of the balanced signals applied to the U7 input terminals. The threshold output taken from U5-11 follows this rectified input which achieves an almost final value after one bit period regardless of which terminal receives the first positive going voltage signal. The final value will always be below the actual signal value because of the inherent voltage drop on diodes CR3 and CR4 and the time constant of charging C8.

R32 is adjusted such that the output of U5 is at the minimum threshold for U7 at quiescent voltage. In the illustrated embodiment, this voltage is approximately 35 milivolts. With strong signal level, the circuit typically reaches a 1 volt operation within 20 nano-seconds of the message start time. By 40 nano-seconds, it is at an average quiescent operating voltage of 1.1 volts. At the completion of the message, the U5-11 output voltage immediately begins to drop back to the 35 millivolt quiescent value with a 0.6 micro-second time constant. Thus, a variable threshold is established to be effective for signals originating at widely spaced points on transmission lines 11 or 11'.

This U15-11 voltage delay is constructed to be sufficiently short such that small signals following large signals will always be above the threshold because small signals will be later in time by the amount of cable necessary to make the signal attenuated to the smaller value. Thus, a specified time always exists for each signal attenuation value, and this optimum delay has been taken into consideration in the design of the receiver network.

U6 will saturate for short triaxial cable distance; however, the ringing during recovery time may be limited by conventional good design practice to always be below the threshold, as is the case with the values illustrated. Because of the differential detection, the receiver is looking at alternately positive and negative going signal edges as U7 output voltage follows with normally alternating positive and negative going signals. The circuit places U7A-14 and U7B-3 outputs at normally at ECL logic high state, and the outputs go negative for the duration of the corresponding threshold crossings by virtue of this arrangement.

The receiver interlock pulse shape circuit 21 includes logic gates U8A-D, U9A-D, U10A, U10B, U12A and the associated passive components which provide a voltage supply and interconnection therebetween. In keeping with modern design practice, these units may be sections of common integrated circuits as the conventional use of like numbers in the drawings indicates.

Figure 8:
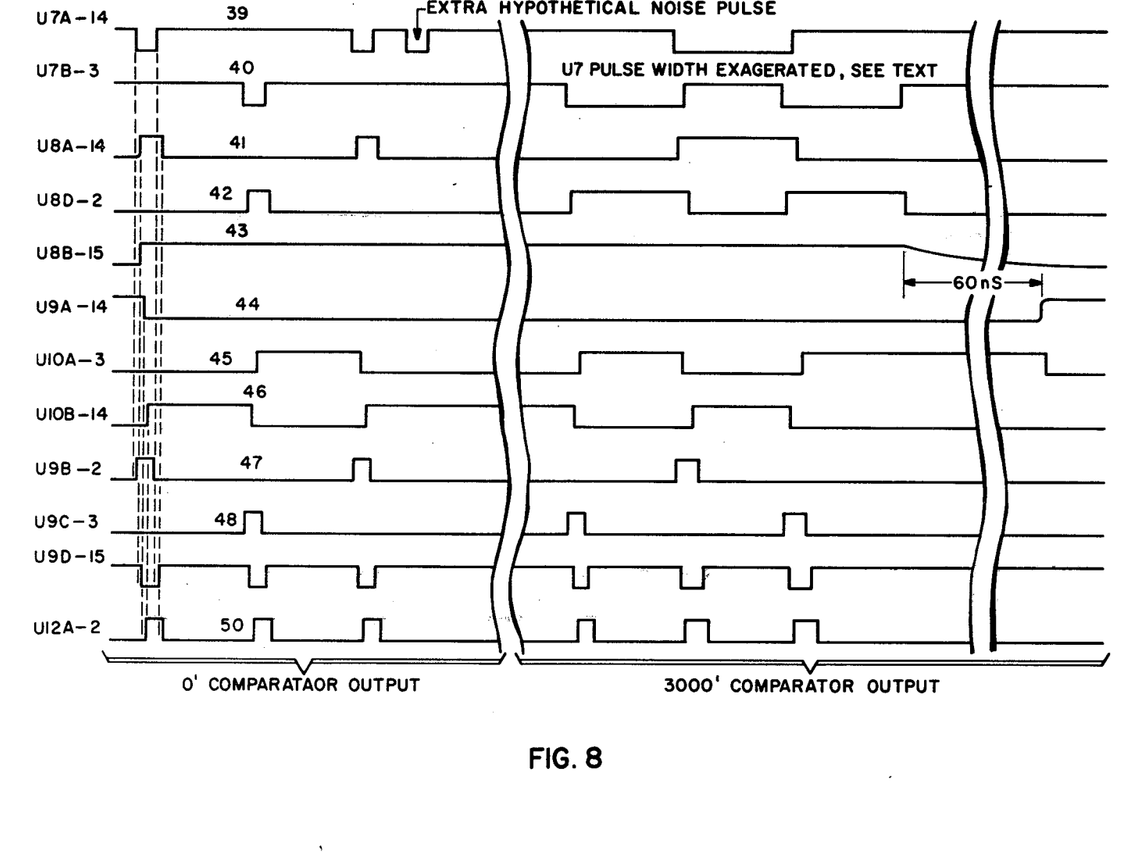
FIGS. 8 and 9 are waveform diagrams of the functioning circuitry shown in FIGS. 4 and 5.
Figure 9:
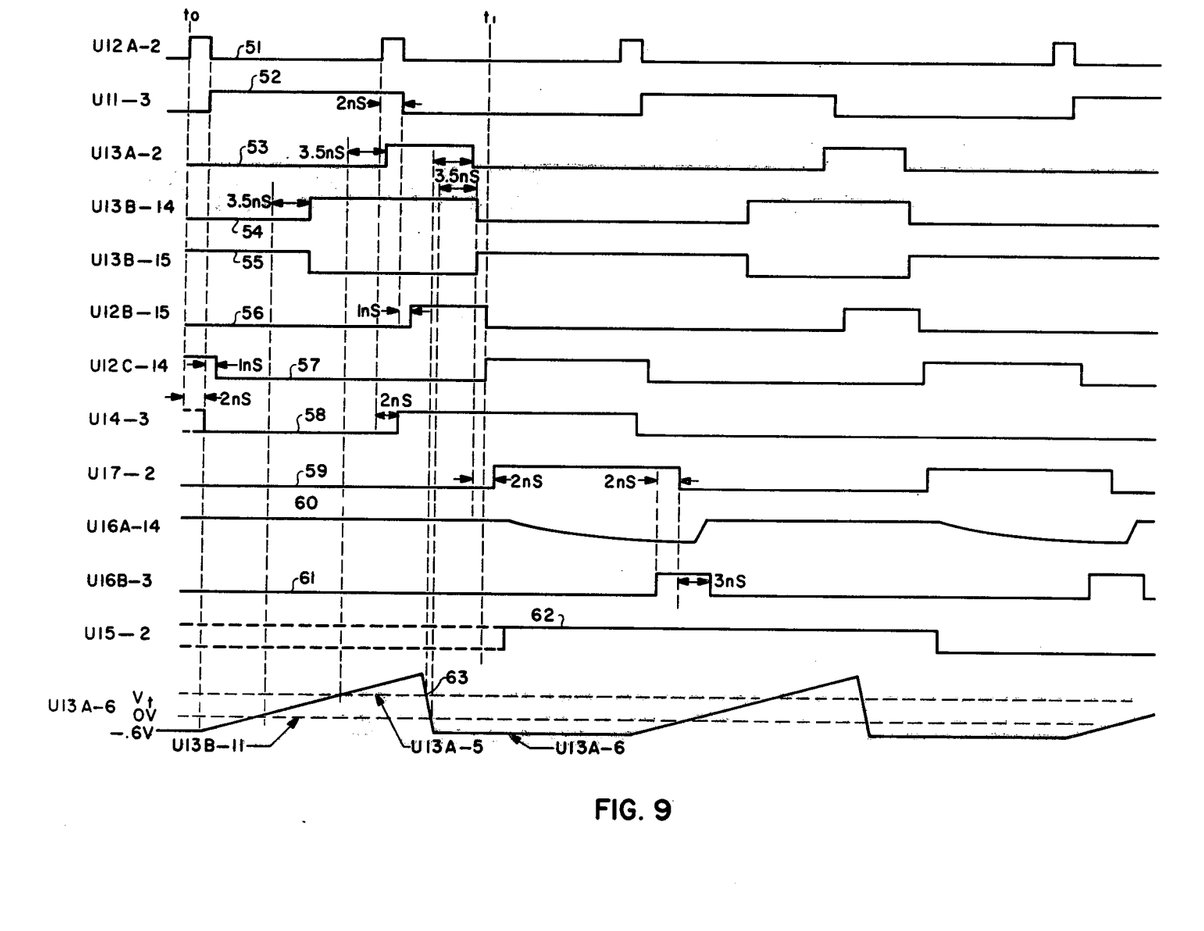

The use of this circuit and its function may be better understood with reference to FIG. 8 showing the interlock pulse shape timing diagram with waveforms 39–50 illustrating the various high-low conduction states of the network. A portion of FIG. 8 as labeled, illustrates a hypothetical zero transmission line length and another portion a 3,000 foot transmission line length. The duty cycle of the U7 output is exaggerated in the 3,000 ft. portions to show that, in operation, the output pulse rising edge always occurs at the same time relative to the U7 output falling edge even with both U7 thresholds simultaneously exceeded. This preserves the relative input-output timing period. From circuit considerations, it is obvious that two corresponding successive U7A output pulses, corresponding to negative going pulses, will not produce two successive positive going U12A output pulses, unless the interlock hold time of 60 nano-seconds, established by R41, has been exceeded between the end of the first U7A output pulse and at the beginning of the second U7A output pulse.

The same is true with the corresponding U7B output also. In practical application, this arrangement guards against the mistaken double pulsing produced by possible signal ringing in the U7 comparator. The U8B-15 interlock control voltage waveform begins to fall immediately, within the device propagation time, when the comparator threshold is no longer exceeded. As previously noted, R-41 may be adjusted to cause U9A-14 to go to a logic high at a predetermined time after the two comparator outputs have attained their quiescent values. This time, 60 nano-seconds in the illustrated embodiment, allows the unlock interval to disengage the interlock circuitry.

That is, the interlock pulse shape circuit guarantees that only the alternating sign threshold crossings will be passed along to the bi-phase-to-NRZ decoder 22. This time delay allows the decoding of a later signal which passes through the delay line in the opposite direction, and this interlock inactivation is necessary because the trailing transition of a left to right message will have the same detected sign as the first transition of a right to left message. Accordingly, this unlocking between messages permits processing signals to flow along transmission line 11 in either direction.

Thus, the output of receiver interlock pulse shape circuit 21 is a series of sharply defined pulses which are used to redefine the pulses originally transmitted on the transmission line 12 before signal degradation due to excessive length and other causes as previously discussed, have occurred. This output is fed to bi-phase to NRZ decoder circuit 22.

As shown in FIG. 4, decoder circuit 22 includes U11, U12B&C, U13A&B, U14, U15, Q-10, and diodes CR7, CR8, CR9, and the associated passive components used for interconnection and time constant determination. This circuit functions essentially as a sampling circuit to detect an initial pulse which is the beginning of a bit period and then wait a predetermined "voting-time" which corresponds to roughly $\frac{3}{4}$ of a bit period and to determine if a second pulse is received. At the conclusion of this calibrated time, the circuit produces 3 separate responses, first, a gated output pulse, GCO, is initiated. Second, an NRZ data output, DO, is initiated. Finally, the electronic time delay circuit is reinitiated for a following bit detection period.

Should a second input pulse appear at U12A-2 during the calibrated integrated time, an NRZ high output is generated. Should no second pulse be received during this calibrated integration time, an NRZ low output, waveform 62 is generated at U15-2. This circuitry has as principal components the units U11, U12B-C, U13A-B, and the ramp circuit. Initially, as indicated at waveform 52, U11-3 is low, causing Q9 to be cut off and Q10 to be turned on with an approximate 27 milliamp current source formed by the 3.4 volts appearing across R53. 2.75 milliamperes will flow through R61 and the balance of about 25 milliamperes through diode CR7. A negative 0.6 volts will appear on the Q10 collector initially, and both U13A and U13B will be held cut off. R54 and R55 form a voltage divider to maintain Q10 base voltage at about negative 1.9 volts.

Initially, the output U12B-15 is also low, so when U12A-2 has a short output pulse, waveform 51, U11-3 goes to a logic high as shown in waveform 52. This causes Q9 to conduct all of the R53 current, which establishes a charging path for C10 with the R61 current, which due to the low dynamic impedance of the diode CR7, presents a very low effective charging impedance. After a predetermined time interval, approximately 8 nano-seconds in the illustrated circuit, the threshold of U13B is exceeded. U13B-15 then goes low in order to prepare U17 for the following positive transition which marks the near completion of the "voting-time" and the initiation of the gated clock output pulse. This is shown by waveform 55.

As will be apparent, the ramp starting voltage is controlled by the Q10 current and diode CR7. Of course, other circuit parameters and ambient conditions such as temperature may have an affect on this starting voltage also. The series arrangement of diodes CR8 and CR9 with resistors R62 and R63 is such that a voltage differential existing between U13A-6 and U13A-5, shown on waveform 63, is kept constant and independent of these extraneous circuit parameters such as temperature. In the illustrated arrangement, using the components shown, the temperature constant of 0.5 millivolts per degree celcius is obtained. Isolation for testing purposes is provided by R64.

The U13A threshold is exceeded about 15 nano-seconds after the first U12A-2 positive going pulse. This causes the U11 input to go to a high. This change of conduction state of U11 causes U11-3 to go low, thereby turning off Q9. Similarly, this causes Q10 to turn on and very rapidly discharge the ramp voltage on C10.

As will also be obvious from analysis of the circuit, with the U11A data input at a high, further U12A to clock pulses will keep U11 in the set state with the ramp voltage going to, or remaining at, the initial quiescent —0.6 volt level.

U13 is configured to have a propagation delay of 3.5 nano-seconds. Since the input ramp voltage takes only 2 nano-seconds from the time it passes through the U13A-5 threshold voltage to reach a quiescent —0.6 volts, the analog ramp voltage is actually already at the quiescent final value before U13A output or U13B output changes to indicate that the ramp has started to go negative. After the U13B threshold is obtained and transcended, U12B-15 goes low, waveform 56, simultaneously with the U12C-14 change. U12C-14 goes high, as shown in waveform 57. The U12B-15 and U12C-14 transition time establishes a critical time interval and virtually all critical events in the circuit operation are measured with respect to this point in time. A label $T_1$ in the waveform diagrams is assigned to this instant in time to facilitate further discussion of the circuitry.

At $T_1$, U11 data input from U12B-15, waveform 56, will go low. Thus, any time after $T_1$, positive going pulses from U12A-2 will reinitiate the analog ramp cycle; and the data input to U14, U12C-14, will go to a logic low 3 nano seconds following the initial U12A-2 positive transition. The initial clock positive transition U12A-2 causes a low to be clocked to the U14-3. However, subsequent clock positive transitions cause a high to be clocked to U14-3, waveform 58, assuming that $T_1$ doesn't occur prior to this time. If the normal U14-3 output obtains a high state before $T_1$, U15-2 will go to, or remain at, a logic high causing a NRZ output, D0 to also go high. This second condition occurs only if the U12A-2 makes a positive transition a predetermined time before $T_1$. This time determination is made by the U14 propagation time plus the U15 maximum set up time. In the circuit configuration illustrated this corresponds to 1.8 nano-seconds plus 0.5 nano-seconds or 2.3 nano-seconds before $T_1$.

Reviewing the overall operation, if the initial U12A-2 positive transition occurs at the time $T_o$ and a second transition occurring in the interval between 3 nano-seconds after $T_o$ and before $T_1$ minus 2.3 nano-seconds it will be clocked out on the NRZ, D0, as a logic high and will not initiate a second voting time and subsequent gated clock output GCO. Second transitions occurring in the open interval greater than $T_1$ plus 0.5 nano-seconds will have no effect on the NRZ output generated by the first transition but will instead generate a new gated clock output pulse having an associated NRZ output of its own. The output level of the NRZ will be determined by the pressure or absence of timing pulses following the second transition with the same criteria as discussed above. The $T_o$ and $T_1$ intervals are both increased in time by the time duration between first and second transition times, or the first to second transition time interval.

The output of this bi-phase to NRZ decoder is connected to a data line driver in order to drive associated circuitry. Circuit details of the line driver will now be described.

Before discussing the circuit details of the clock line driver, consideration on the clock width control circuit 23 will be given. The clock width control circuit includes solid state devices U16A-B, U17, capacitor C11, R52, R70, R72, R73, and R74. Identical data number line driver circuit 25 is driven by the bi-phase to NRZ decoder 22. Due to the action of U13B-15 going high about 1 nano-second before $T_1$, U17-2 will go to an ECL high about 1 nano-second following $T_1$ due to propagation time. This condition change is illustrated at waveform 59. This is because the U17 data input, U17-11, is at ground potential, ECL high. This positive going transition causes the U16A-14 emitter follower to begin to fall as C11 is discharged through R72 and R73, waveform 60. U16A-14 output impedance is effectively infinite during this time because the internal base emitter junction is back biased by the applied voltages.

As the U16A-14 voltage falls through the ECL threshold, the U16B-3 waveform 61, resets U17-2 and the clock output pulse is completed. As the U16A-13 input goes to a logic low, the U16A-14 output transistor is caused to go to an ECL high one nano-second later. However, during this interval C11 is charged through the U16A forward biased base emitter output transistor junction, since this junction presents an extremely low impedance compared to that presented by R72 and R73. Thus, the clock width control circuit 23 is non-linear and capable of very rapid recovery time from the completion of one clock pulse to the start of another. Clock pulse width can be easily and smoothly adjusted in the illustrated circuit embodiment from 8 nano-seconds to 32 nano-seconds with a 40 nano-second clock period. R73 provides this adjustment.

Clock line driver 24 and data line driver 25 are essentially identical circuits differing only in the drive circuit providing their input signal. Accordingly, only the clock line driver will be described in detail. The data line driver will function in the same manner.

Clock line driver 24 includes solid state devices Q13 and Q14 together with resistances R68, R69, R70, R71, and R74. R68 and R69 provide an adjustable constant current source for the differential pair Q13 and Q14. Normally, U17-2 is low and U17-3 is high, causing all of the R68 current to flow through R71. R69 is adjusted so that 6 volts is dropped across R71 making the gated clock output voltage zero volts. This output will correspond in the illustrated circuit to a current of 118 milliampers through Q14.

Whenever U17-2 goes high, R68 current will flow through Q13 rather than Q14. This means that the gated clock output is connected to +6 volts through 51 ohms. Since Q14 is a high impedance current source, the gated clock output is effectively a 118 milliampere current source in parallel with the 51 ohm load. This allows a zero-to-three-volt amplitude clock pulse to be transmitted into a 50 ohm terminated cable which is terminated at both ends to minimize pulse distortions caused by end reflected signal impedance discontinuities.

This circuit has the advantage of being inherently short circuit proof. A shorted GCO connection actually causes less dissipation in Q14 than a proper 50 ohm termination would because the Q14 voltage drop is then limited to about 1.4 volts at the constant current of 118 milliamperes rather than the 4.4 volts normally supplied. This is well within the power rating capabilities of the components specified.

Figure 5:
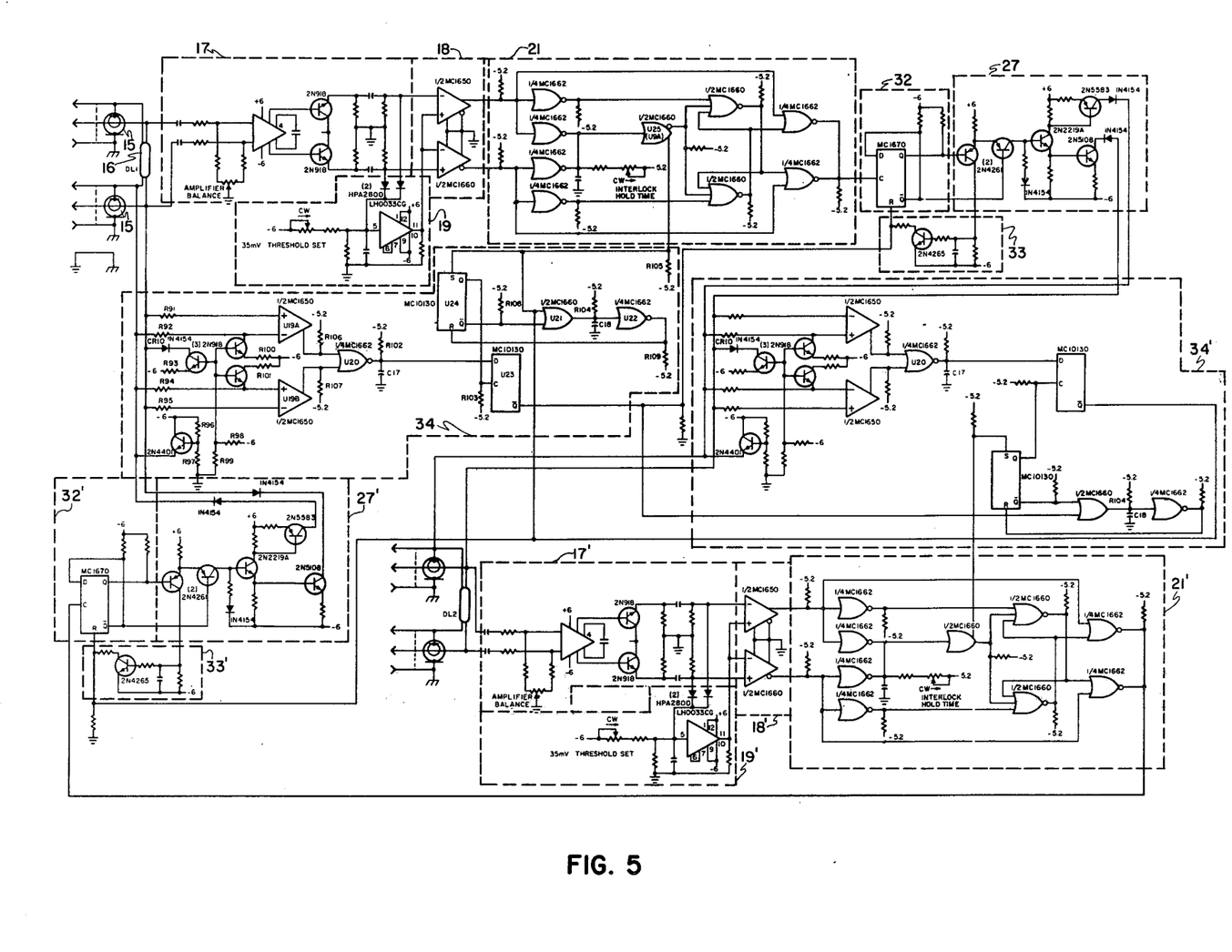
FIG. 5 is a schematic representation of the four-port modem shown in FIG. 3.

Referring now to FIG. 5, it will be observed that the majority of the four-port network schematic is essentially similar to that already described in the connection with the two port modem 12, FIG. 4. Because no data conversion at the input or output is required, the four port network 14 is in reality a conceptionally more simple circuit than the two port modem 12. The complexity of circuitry on the schematic is caused by a duplication of circuitry necessary to transfer from line 11 to line 11', and vice versa. In general, the two principal differences observed will be the cross coupled signal interlock which is used to prevent data transmission on one line during transmission periods on the other; and the fault sense circuit which detects failures of either line.

As previously discussed, the receipt of any signal by delay line 16 (DL1) will cause U25 or gate output to go high. This signal is applied directly, via the "wired-or", to the connection to the reset input of U4 flip-flop which feeds the delay line 16' line driver. Thus, the delay line 16' line driver can never be activated by a signal from delay line 16. The converse is also true. This prohibits a latch up from occurring between the two lines.

Q20, Q21, and Q22 together with R93, R98, R99, R100, and R101 form three matched current sources which cause a constant current of 13 milliamperes to flow through R92, R94 and diode CR10 in series with the parallel connection of two DL1 triax 75 ohm loads. Q23, R96 and R97 clamp the triax inner shield at +1.7 volts. All three current sources may be seen to terminate on the Q23 emitter, the triaxial inner shield node; and this point would otherwise be drawn to a very negative value. Two parallel triaxial lines would normally form a 37.5 ohm load, neglecting any line resistances. Therefore, a short on one line would cause the load to go to zero ohms and an open circuit in one line would cause the load to go to 75 ohms since only one triaxial load would remain. From a routine consideration of all circuit values shown and the normal 5% resistor variations and other component tolerances including the series cable resistance and the comparator tolerances in the U19 circuit, one can determine that the values for R92 of 30 ohms R95 of 55 ohms the U19A and U-19B outputs will never go to a logic high in the absence of bi-phase signals on the line. Considering U19A, for example, one sees that it is basically comparing the triaxial parallel load resistance with a value of R92, 30 ohms. Thus, when the triaxial resistance is greater than 30 ohms, the R92 voltage input U19A will be more positive than the triaxial input and the U19A output will be a logic low.

Only a shorted line or a superimposed bi-phase signal voltage will make the U19A output go up high. In a similar fashion, U19B output will go high with a high impedance or open circuit triaxial line which causes the line parallel impedance to go above the nominal 55 ohms or with a superimposed by-phase signal on that line.

Diode CR10 provides line isolation in the event of a four port network power loss in the same way that diode CR6 previously discussed in connection with FIG. 4 functions. Similarly, R91 and R95 provide a minimum dynamic and static loading of the triaxial line under both power and no power situations.

In the bi-phase signal quiescent state, U23-C is at a logic low and the U20 output passes directly through the U23 latch as an inverter to U23-Q. With the U23-D normally high, the U23-Q output will be low, thus allowing the U4-R input to remain low with U4 free to toggle the transmit commands. Thus, it will be seen that the U4 serves essentially the same purpose as the pulse shaping performed with respect to FIG. 4, except in the absence of data conversion when it serves merely to reconstruct bi-phase signals which have undergone transitions due to line impedances and other signal transfer interferences.

If a line failure occurs, the appropriate U19 comparator is toggled and the U20 output falls at a rate determined by the R102 and C17 time constant. This results in U4 being locked in an off state. Thus if delay line 16 (DL1) receives an incoming bi-phase signal, U4 will not allow it to be transmitted to delay line 16' (DL2).

Within a few nanoseconds of any bi-phase signal voltage on the triaxial line U24-S will go high, which causes U23-C to also go high. This change of state will lock the U23-Q output at its conduction state, either high or low, when the change occurs. If U23-Q is locked at the high state, U4 will be inhibited from transmitting delay line 16 signals to delay line 16'. Thus, line 16' is protected from the bad data on line 16. If U23Q is locked in the low state, then the signals would be transmitted via U4 since the delay line 16 signals would not be corrupted by cable failure.

The U23-C blocking voltage remains high for a time after the U24-S signal goes low due to the circuit configuration provided by R104, R108, R109, C18, U21, and U22. This permits U20 to fully stabilize at a proper line condition value after the transient occasioned by bi-phase signals in the U19 comparator circuits. Approximately 60 nano-seconds after the bi-phase signal has ceased, U24-S goes low. Similarly, the U21 output driving voltage follows low. C18 discharges with the parallel 104 resistance and the U22 output goes high, thereby resetting U24. This change returns U23-C input to the low, or non-locking value where U23-Q can be further updated by line 16 conditions. This change also returns the U21 output to a high value which represents the initial conditions. Similarly, the circuitry associated with delay line 16' inhibits and controls the data transmission to delay line 16.

Thus, it may be see that the line fault sensing circuit 34 and 34' can update the inhibit enable circuit only at times when no bi-phase signals would be present which would cause an erroneous fault to be sensed.

Additionally, any bi-phase signal received at delay line 16 will inhibit the transmitter which drives that delay line thus preventing the driver from locking on its own signals.

As indicated at various places in this schematic, both the four port modem 12 and four port network 14 require a plus and minus 6 volt DC power supply. Such power supplies are conventional in solid state circuitry; and a choice among the various power supplies available may be made in dependence upon size, cost, and other external design considerations.

Figure 6:
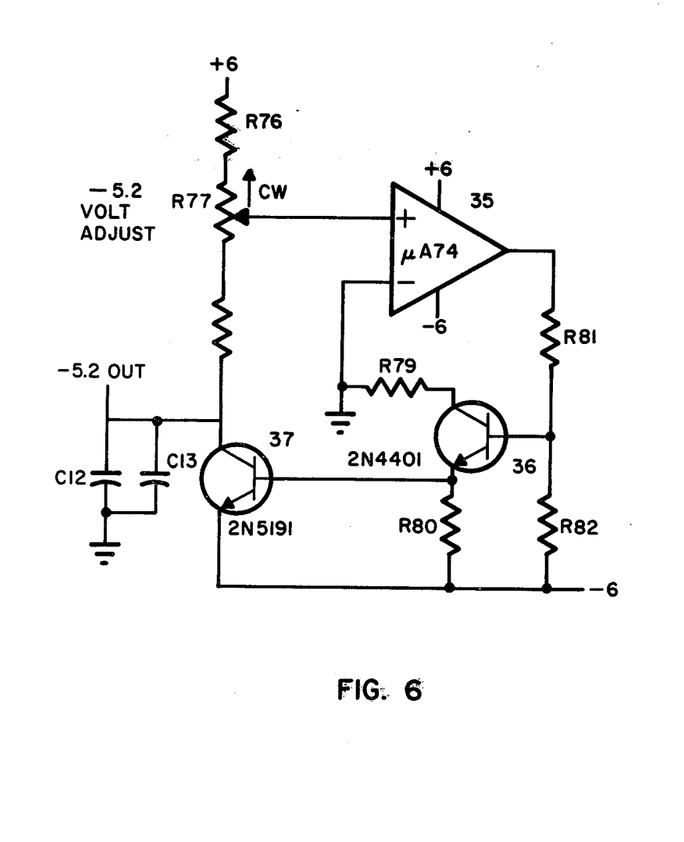
FIGS. 6 and 7 are a schematics of voltage regulators used to supply regulated voltages.

Referring to FIG. 6, a regulator circuit using the plus and minus 6 volt DC supply to provide a minus 5.2 volt regulated output is illustrated. As shown, transistor 37 serves as a series regulating element between ±6 volt input and the −5.2 volt output. C12 and C13 serve to minimize the regulator dynamic output impedance and stabilize the voltage. R76, R77, and R78 form a voltage divider between the ±6 volt and the −5.2 volt output. R77 is adjusted in the position that the wiper of R77 will be at zero volts with the proper end point voltages. Op-amp 35 senses the deviation of U18-3 from ground potential and amplifies the difference and applies the amplified voltage to R81 and R82 voltage divider to the base of transistor 36. If the −5.2 output voltage starts to fall, operational amplifier 35 will become slightly positive, causing its output to become very positive and; in turn, the base of transistor 36 will draw more current. This will cause transistor 37 to conduct more heavily and will tend to make the collector therof more negative which, is the essential negative feedback required for the regulation to cause operational amplifier 35 to return to its normal condition and maintain the desired −5.2 volt output.

Figure 7:
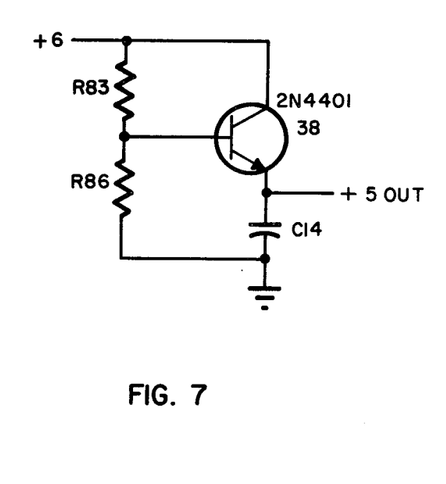

Referring to FIG. 7 it will be seen that the +6 volt DC potential is dropped to a regulated +5 volts by a somewhat simpler circuit. As shown, R83 and R86 form a voltage divider which places approximately 5.6 volts on the base of transistor 38. Transistor 38 is an emitter follower which drops the 5.6 volts down to a nominal 5 volts. C14 provides a low RF impedance to ground. Although this circuit does not have the specifically designed short circuit characteristics of the regulator of FIG. 6, care in component selection will permit short operations at shorted potentials without equipment failure thus enabling trouble-shooting and adjustment.

The construction of the aforementioned circuits is accomplished by conventional fabrication techniques which, due to modern circuitry, permit most of the components to be installed on small circuit boards. In this assembly and fabrication, conventional good design practice is followed with the expected trade offs of cost and manufacturing tolerances as would influence the mission requirements for which the system is to be used.

The foregoing description taken together with the appended claims constitute disclosure such as to enable a person skilled in the electronic and digital circuit arts, having the benefit of the teachings contained therein to make and use the invention. Further, the circuitry herein described meets the stated object of invention and generally constitutes a meritorious advance in the art unobvious to such workers not having the benefit of these teachings.

What is claimed is:

1. A bi-directional data transmission system comprising:
   a bi-directional transmission line having a finite length for transmission of electrical energy pulses and having a characteristic electrical impedance;
   terminating resistances connected to each end of said bi-directional transmission line and having a value equal to the characteristic electrical impedance; and
   a plurality of modem units connected in series with said bi-directional transmission line, each modem including,
      a delay means connected to cause a finite time of transmission therethrough;
      a differential detector circuit connected across said delay means to detect propagating signals being transmitted in said bi-directional transmission line at predetermined time intervals;
   a receiver interlock circuit connected to said differential detector circuit, said receiver interlock circuit configured to pass only voltage threshold crossings having alternating signs;
   a pulse shape circuit connected to said receiver interlock circuit to receive the output therefrom and configured to redefine pulses originally transmitted on said transmission line; and
   line driving circuitry connected to said bi-directional transmission line for transmission thereto of data signals whereby other modems may receive these data signals.

2. A bi-directional data transmission system according to claim 1 in which said delay means includes a passive circuit permitting signal passage independent of the powered operation of said modem.

3. A bi-directional data transmission system according to claim 2 wherein said passive circuit includes a finite length of electrical transmission line.

4. A bi-directional transmission system according to claim 1 wherein said differential detector circuit includes a threshold circuit to establish an acceptable minimum signal level to which the system will respond.

5. A bi-directional transmission system according to claim 4 in which said threshold circuit includes a full wave rectifier for effectively determining the threshold independent of propagation direction.

6. A bi-directional transmission system according to claim 4 in which said threshold circuit has a variable threshold to permit the processsing of signals originating from widely separated points on said bi-directional transmission line.

7. A bi-directional data transmission system according to claim 1 further including:
   a second bi-directional transmission line having a characteristic impedance and a finite length for transmission of electrical energy signals;
   at least one modem connected in said second bi-directional transmission line; and
   an electrical network connected between said second bi-directional transmission line and the aforesaid bi-directional transmission line for two-way signal transmission therebetween,
   said electrical network comprising;
      a delay means connected to cause a finite time of transmission therethrough, said delay means including a passive circuit permitting signal passage independent of the powered operation of said electrical network;
      a differential detector circuit connected across said delay means to detect propagating signals being transmitted in said bi-directional transmission line at predetermined time intervals;
      a receiver interlock circuit connected to said differential detector circuit, said receiver interlock circuit configured to pass only voltage threshold crossings having alternating signs;
      a pulse shape circuit connected to said receiver interlock circuit to receive the output therefrom and configured to redefine pulses originally transmitted on said transmission line;
      a bi-phase reconstructor circuit connected to said pulse shape circuit to change the output thereof to a predetermined format; and
      line fault detection means responsive to short and open circuit conditions in the aforesaid bi-directional data transmission line and configured to interrupt the two way transmission therebetween, whereby degraded signals occasioned by said short and open circuit conditions are not transmitted therebetween.

8. A modem for a bi-directional data transmission system comprising:
   input means for receiving electrical signals from the data transmission system;
   a delay means connected to said input means for establishing a predetermined time of passage for electrical signals received thereby, said delay means including a passive circuit permitting signal passage independent of the powered operation of said modem;
   differential detection means connected to said input means and to said delay means for detecting differences in signal levels therebetween;
   a receiver interlock circuit connected to said differential detector circuit, said receiver interlock circuit configured to pass only voltage threshold crossings having alternating signs;
   a pulse shape circuit connected to said receiver interlock circuit to receive the output therefrom and configured to redefine pulses originally transmitted on said transmission line; and
   data conversion means connected to said differential detection means for conversion of detected signals to a predetermined data format.

9. A modem according to claim 8 wherein said passive circuit includes a finite length of electrical transmission line.

10. A modem according to claim 8 wherein said differential detector circuit includes a threshold circuit to establish an acceptable minimum signal level to which the system will respond.

11. A bi-directional transmission system according to claim 10 in which said threshold circuit has a variable threshold to permit the processing of signals originating from widely separated points on said bi-directional transmission line.

12. A modem according to claim 10 in which said threshold circuit includes a full wave rectifier for effectively determining the threshold independent of propagation direction.

* * * * *